US005877972A

United States Patent [19]

Aoki et al.

[11] Patent Number: 5,877,972

[45] Date of Patent: Mar. 2, 1999

[54] HIGH SPEED INCREMENTER WITH ARRAY METHOD

[75] Inventors: Naoaki Aoki, Austin; Osamu Takahashi, Round Rock; Joel Abraham Silberman; Sang Hoo Dhong, both of Ausin, all of Tex.

[73] Assignee: International Business Machines Corporation, Armonk, N.Y.

[21] Appl. No.: 783,979

[22] Filed: Jan. 15, 1997

[51] Int. Cl.[6] ................................ G06F 7/50; G06F 7/38

[52] U.S. Cl. ...................................... 364/770; 364/716.03

[58] Field of Search ............................... 364/770, 716.03

[56] References Cited

U.S. PATENT DOCUMENTS

| | | | |
|---|---|---|---|
| 3,989,940 | 11/1976 | Kihara | 364/770 |
| 4,153,939 | 5/1979 | Kudou | 364/770 |
| 4,280,190 | 7/1981 | Smith | 364/770 |
| 4,417,315 | 11/1983 | Russell | 364/770 |
| 4,417,316 | 11/1983 | Best | 364/770 |
| 4,700,325 | 10/1987 | Ware | 364/770 |
| 4,953,115 | 8/1990 | Kanoh | 364/770 |
| 4,972,105 | 11/1990 | Burton et al. | 307/468 |
| 5,003,202 | 3/1991 | Keida | 307/465 |
| 5,221,867 | 6/1993 | Mitra et al. | 307/465 |
| 5,398,198 | 3/1995 | Mahant-Shetti et al. | 364/716 |

OTHER PUBLICATIONS

IBM Tech Discl. Bull. vol. 25 No. 1 Jun. 1982, pp. 71–73, “FET DRAM Look–Ahead Address Incrementer”.
IBM Tech Discl. Bull. vol. 25 No. 1 Jun. 1982, pp. 75–76, “High–Speed Incrementer Using Transfer Gates”.

IBM Tech Discl. Bull. vol. 11 No. 3 Aug. 1968, pp. 297–298, “incrementer–Decrement Logic”.

J.W. Jones and J.C. Logue, “Array Logic with Dynamic Bit Selection and 4–State Crosspoint Conditioning”, IBM Technical Disclosure Bulletin, vol. 17 No. 3 Aug. 1974.

*Primary Examiner*—Tan V. Mai
*Attorney, Agent, or Firm*—Sawyer & Associates; Casimer K. Salys

[57] ABSTRACT

A high-speed incrementer array for incrementing a data input value by a binary one, wherein the data input value comprises a plurality of input bit values. The incrementer array includes a plurality of word lines, bit-line pairs, and sense amplifiers. The input bit values are received as a plurality of complement input signals and a plurality of true input signals. The complement input signals are transmitted on the plurality of word lines that form the rows of the array. Each one of plurality of bit-line pairs is located in a respective column of the array and is coupled to particular ones of the word lines in the rows of the array. Each one of the plurality of sense amplifiers is coupled to a respective bit-line pair for sensing a voltage difference between the bit-line pair, such that the bit-line pair and the sense amplifier perform a logical NOR of the complement input signals to produce a NOR output. Each one of the plurality of exclusive-or gates is coupled to a respective NOR output and to a particular one of the true input signals for generating an incremented output signal.

16 Claims, 4 Drawing Sheets

50
62
62A
62B
64
66
A63
A62
A61
A2
A1
WL
RWL
70
76A
76B
78
VG
BL
68
SA
72
A0
60
A1
A2
92
A61
A62
A63
EXOR
74
B0
B1
B2
B61
B62
B63

HIGH SPEED INCREMENTER WITH ARRAY METHOD

TECHNICAL FIELD

This patent application relates to logic circuits, and more particularly to an incrementer circuit for incrementing an input value by one.

BACKGROUND

Higher performance has been demanded of most microprocessors recently. Therefore, higher performance for each microprocessor function is required. Among the most basic functions of microprocessors are various arithmetic operations, such as simple addition. Therefore, an important circuit in a microprocessor is an adder, which adds two or more data values and produces a result.

Besides adding the values of two variables, the adder is also used to calculate memory addresses. Consider for example the accessing of sequential memory addresses by the microprocessor. After accessing the first memory addresses, access of the second memory address requires that the adder add the value of the first memory address to a second value to produce the next memory address. Since the addresses are sequential, in this example the second value to be added to the first address is the number one. The faster the adder can increment a memory address to generate the next address, the faster the microprocessor can access memory, which increases overall performance. An adder, however, conventionally requires larger area for higher performance. A large area of a circuit inevitably leads to a large chip size, which contradicts the current requirements of microprocessors; higher performance coupled with a small area.

Accordingly, what is needed is an incremental arithmetic function for a microprocessor that requires a small area, while providing high-performance. The present invention addresses such a need.

SUMMARY

The present invention is a method and system for providing a high-speed incrementer array for incrementing a data input value by a binary one, wherein the data input value comprises a plurality of input bit values. The incrementer array includes a plurality of word lines, bit-line pairs, and sense amplifiers. The input bit values are received as a plurality of complement input signals and a plurality of true input signals. The complement input signals are transmitted on the plurality of word lines that form the rows of the array. Each one of plurality of bit-line pairs is located in a respective column of the array and is coupled to particular ones of the word lines in the rows of the array. Each one of the plurality of sense amplifiers is coupled to a respective bit-line pair for sensing a voltage difference between the bit-line pair, such that the bit-line pair and the sense amplifier perform a logical NOR of the complement input signals to produce a NOR output. Each one of the plurality of exclusive-or gates is coupled to a respective NOR output and to a particular one of the true input signals for generating an incremented output signal.

According to the method and system disclosed herein, the incrementer array increments a data value faster than a conventional adder, while requiring less area.

DETAILED DESCRIPTION

The illustrative embodiment relates to an improvement in arithmetic circuits. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

The present invention provides an incrementing arithmetic function for a microprocessor. Incrementing is different from adding in that an adder adds two variable input values, whereas an incrementer adds one variable input value to a constant value of one. That is, given an input value A, an incrementer performs the function, $$B=A+1$$

Figure 1:
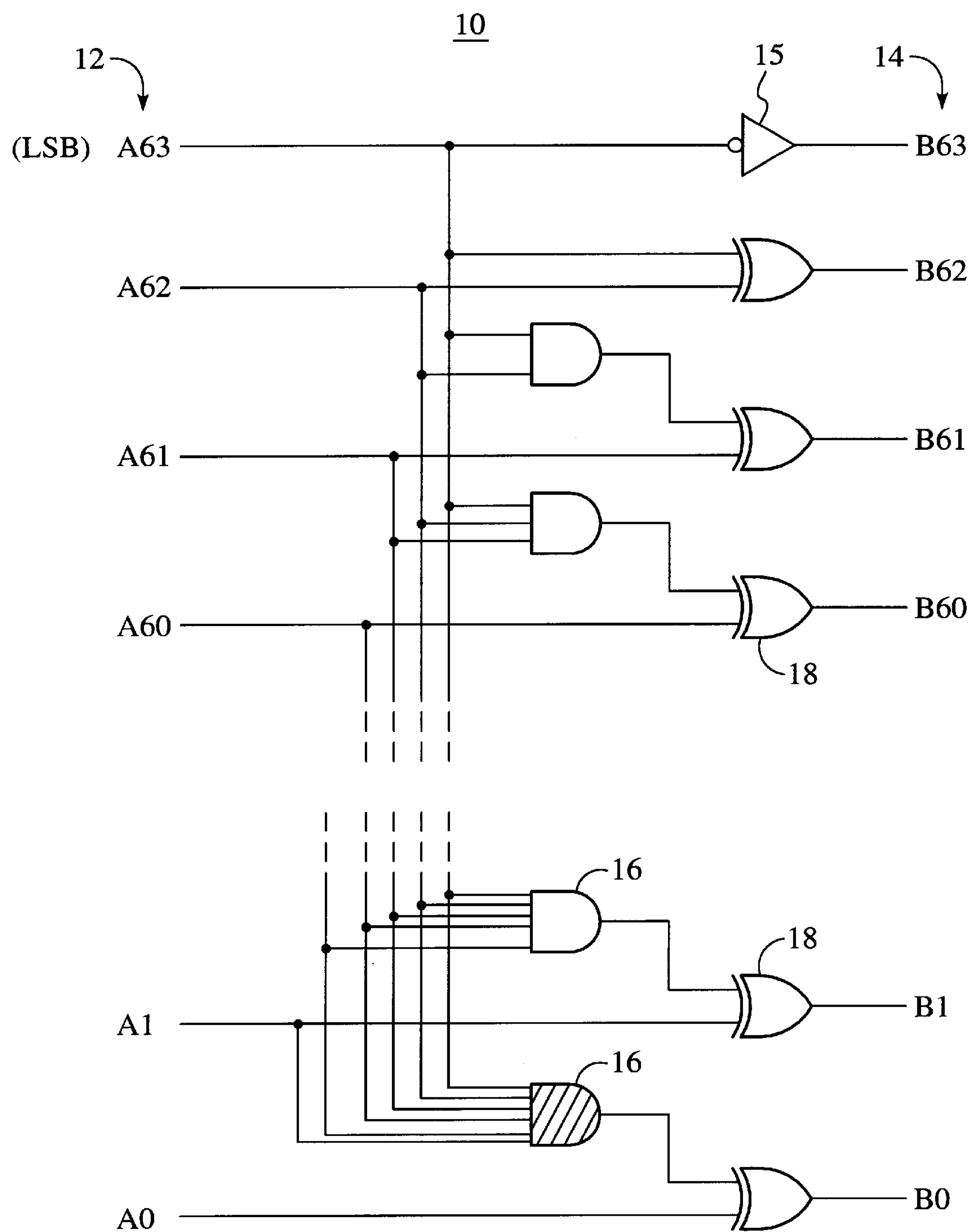
FIG. 1 is a block diagram illustrating one implementation of a logic circuit for performing the function of an incrementer.

FIG. 1 is a block diagram illustrating one possible implementation of a logic circuit for performing the desired incrementer function. The logic circuit 10 receives a sixty-four bit input value 12 (A63, A62, . . . , A0) and increments the input value 12 by a binary one to generate a sixty-four bit output value 14 (B63, B62, . . . B0). The least significant bit of the input value (A63) is input to inverter 15 which inverts the value of the bit and thus increments its value. Each of the remaining bits of the input value 12 is logically ANDed with all of the lesser significant bits using a respective AND gate 16 (output high when both inputs are high). The output of each AND gate 16 is then exclusively-ored with the next significant input bit using a respective Exclusive-Or gate 18 (output high when one input or the other is high, but not both). The output if the series of Exclusive-Or gates 18 produces respective bits (B63, B62, . . . B0) of the output value 14.

This design is cumbersome because the logic circuit 10 requires the use of N-stacked AND gates along the critical path. With N-way ANDing, high performance cannot be achieved in a circuit when N is large. For example, to produce bit B63 of the output, sixty-three bits of the input value 12 must be ANDed through one AND gate 16. ANDing this many bits is slow and thus creates a bottleneck in the logic circuit 10. Therefore, incrementing an input value 12 using a logic circuit 10 which includes a combination of AND gates 16 is impractical in today's microprocessors.

Figure 2:
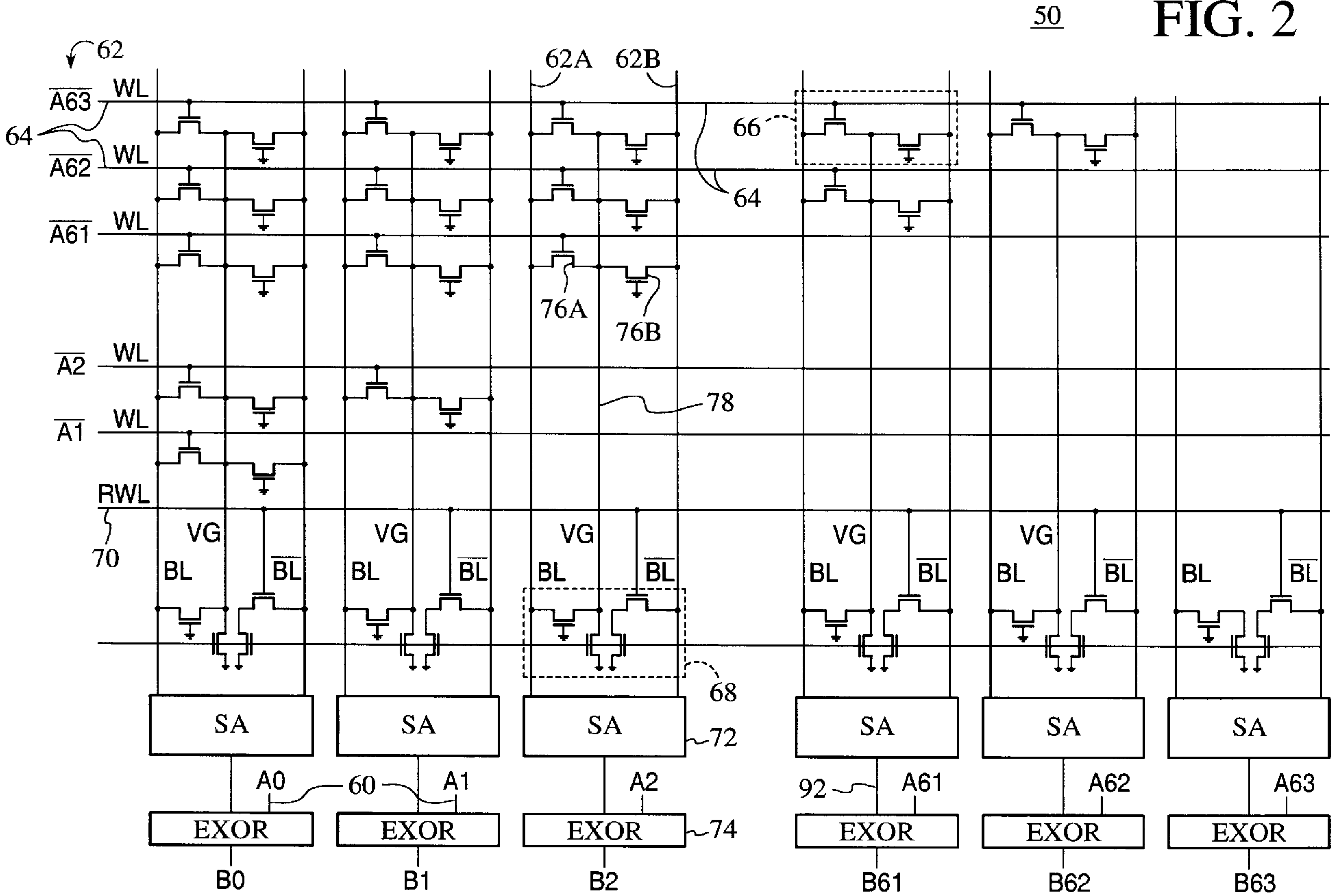
FIG. 2 is a block diagram illustrating a sixty-four bit high-speed incrementer array 20 in accordance with the present invention.

The present invention provides an incrementer array circuit that performs a high-speed increment function, while requiring a small area, as shown with reference to FIG. 2.

FIG. 2 is a block diagram illustrating a sixty-four bit high-speed incrementer array 50 in accordance with the present invention. Although the incrementer array 50 of the present invention will be described in terms of a sixty-four bit array, those with of ordinary skill in the art will recognize that the incrementer array could be implemented as an array of any number of bits.

The incrementer array 50 receives an input value as a plurality of true input signals 60 (A0, A1,. . ., A63), where each of the input signals corresponds to a bit in the input value, and a plurality of corresponding complement input signals 62. As shown, each of the complement input signals 62 are transmitted over a plurality of word lines (WL) 64, which form the rows of the array 50.

Each column of the array comprises a bit-line pair 62 (bit-line true 62*a* and bit-line complement 62*b*), zero or more cells 66 coupled between the bit-line pair and a word line 64, a reference cell 68 coupled between the bit-line pair 62 and a reference word line (RWL) 70, a sense amplifier 72 coupled to the bit-line pair 62, and an Exclusive-Or gate 74 coupled to the sense amplifier 72 and one of the true input signals 60.

Each of the Exclusive-Or gates 74 in the columns of the array 50 produce respective output signals (B0, B1,. . .,B63). The output signals are arranged such that each output signal delineates a specific column in the array 50. Each of the true input signals 60 is input into the Exclusive-Or gate 74 located in the column of the corresponding output signal (e.g., input signal A63 is input into the Exclusive-Or gate located in column B63).

The incrementer array 50 performs the overall increment function; incrementing the input value represented by the input signals 60 and 62 to produce an incremented output value represented by the output signals, but the increment function is implemented differently.

According to the present invention, negative logic is used to increase the speed of increment function. The bit-line pair 62 the cells 66, and the sense amplifier 72 in each column of the array 50 replace the AND gate 16 of FIG. 1 by NORing the complement input signals 62 in that column. Performing the NOR function on the complementary input signals 62 is the equivalent to ANDing the true input signals 60, as shown by the following equation:

$$A63A62A61 \ldots A1 = \overline{\overline{A63}+\overline{A62}+\overline{A61}+\ldots+\overline{A1}}$$

According to the present invention, the incrementer array is highly structured. In order to perform the NOR function, the cells 66 are arranged in an upper diagonal pattern in an array. For an array having N columns, the number of cells 66 located in any given column is given by the equation:

$$\#\_of\ \_cells\ in\ column\ (i)=(N-1)-N_1$$

where i=0 . . N. For example, for a sixty-four bit input value, the array includes sixty-four columns. Therefore, in column zero, there are sixty-three cells 66 (63-0), in column one, there are sixty-two cells 66 (63-1), . . . , in column sixty-two there is one cell (63-62), and in column sixty-three, there are no cells 66 (63-63).

The operation of the incrementer array 50 will be explained by way of example with to the generation of output signals B63, B62, and B61. Referring to output signal B63, since input signal A63 represents the least significant bit, column B63 must perform an inverter function (see FIG. 1). Because there are no cells 66 in column B63, the sense amplifier 72 output is always one. This one output is then Exclusive-Ored with input signal A63. If input signal A63 is binary one, then the value of output signal B63 is binary zero, and vice versa.

Referring to output signal B62, column B62 includes one cell, which is coupled to the word line 64 corresponding to A63 complement, and the output of the sense amplifier 72 is the complement of A63 complement, which is A63 true. This output is then Exclusively-Ored with input signal A62 to produce B62.

Referring to the output signal B61, column B61 includes two cells 66 which are coupled to the word lines corresponding to A63 complement and A62 complement, respectively. The output of the sense amplifier 72 is the NORing of A63 complement and A62 complement. This output is then Exclusively-Ored with input signal A61 to produce B61.

Figure 3:
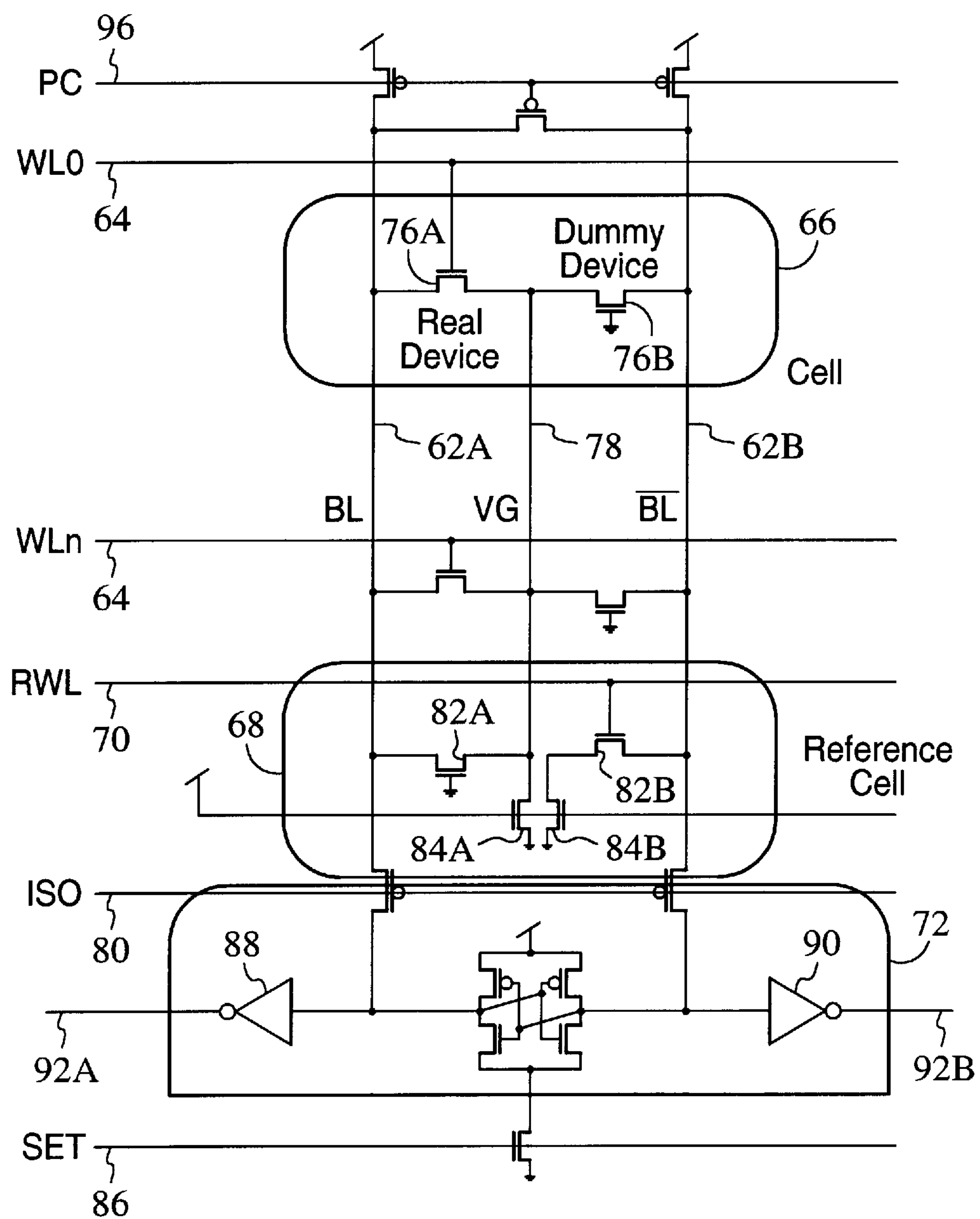
FIG. 3 is a detailed block diagram of a column in the incrementer array.

FIG. 3 is a detailed block diagram of a column in the incrementer array. Each cell 66 includes two transistors, a primary transistor 76*a* and a dummy transistor 76*b*. The primary transistor 76*a* is coupled between the word line 64 corresponding to the row location of the cell 66 and the bit-line true 62*a* in the column of the cell 66. The dummy transistor 76*b* is coupled to the corresponding bit-line complement 62*b* and to a (virtual ground) VG signal 78 to balance the primary transistor 76*a*.

The last row in each column in the incrementer array comprises the reference word line (RWL) 70 and a isolation signal (ISO) 80, a pair of reference transistors (dummy reference transistor 82*a* and reference transistor 82*b*), and a pair of bias transistors (dummy bias transistor 84*a* and bias transistor 84*b*). The RWL 70 is coupled to each of the complement bit-lines 62*b* through the reference transistors 82*b*.

The dummy bias transistor 84*a* is coupled between ground and all of the dummy transistors 76 in the column via the VG signal 78 in order to control the falling rate of the bit-line true 62*a*. The VG signal 78 avoids a voltage drop of the bit-line true 62*a* by simultaneous switching of the word lines 64. This improves the precharge operation and the cycle time, as explained further below.

The sense amplifier 72, which is of conventional design, is coupled between the bit-line pair 62 and a set signal 86. The sense amplifier 72 includes two output inverters 88 and 90 for generating a true output signal 92*a* and a complement output signal 92*b*, respectively. Both the true output signal 92 and the complement output signal 94 are input into the exclusive-or gate 74 in that column. Therefore, the input to the exclusive-OR gate 74 must also include both a true input signal 60 and a complement input signal 62;

$$EXOR=SA\bar{A}+\overline{SA}A$$

where SA is the sense amplifier output signals.

In operation, the bit-line true 62*a* and the bit-line complement 62*b* in each column are precharged via a precharge signal 96. Thereafter, receiving the complement input signals 62 via the word lines 64 causes the primary transistors 64 to activate, and the RWL 70 creates a voltage difference between each pair of bit-lines 64. The purpose of the reference transistor 82*b* is to generate the necessary voltage difference between bit-line true 62*a* and bit-line compliment 62*b* for the sense amplifier 72 60 to detect. The sizes of the reference transistor 82*b* and the bias transistor 84*b* are designed to adjust the fall speed of the bit-line true 62*a* and bit-line compliment 62*b*.

The dummy reference transistor 82*a*, which is connected to bit-line true 62*a*, is always turned-off. The purposes of the dummy reference transistor 82*a* and the dummy bias transistor 84*a* are to balance the node capacitance between the bit-line true 62*a* and the bit-line compliment 62*b*. In the case where the complement input signal passed from the word line 64 to the bit-line true 62*a* is logic one, the voltage difference between the bit-line true 62*a* and the bit-line compliment 62*b* becomes positive. In the case where the complement input signal passed to the bit-line true 62*a* is logic zero, the voltage difference between the bit-line true 62*a* and the bit-line compliment 62*b* becomes negative.

Once the voltage difference between the bit-line true 62*a* and the bit-line compliment 62*b* reaches a detectable level, both the isolation signal 80 and the set signal 86 are activated. The set signal 86 activates the sense amplifier 72, and the isolation signal 80 isolates the bit-line pair 62 from sense amplifier 72 so that the sense amplifier 72 may react quickly and not have to drive the bit-line pair 62.

In this manner, the sense amplifier 72 can detect the voltage difference between the bit-line true 62*a* and the bit-line compliment 62*b* and generate the output 92 in the correct polarity. Since the bit-line compliment 62*b* falls at half speed of the bit-line true 62*a* with complement input signal 62 being logic zero, the sense amplifier 72 performance is well balanced to detect both cases. After the sense amplifier 72 is isolated, the bit-line true 62*a* and the bit-line compliment 62*b* are precharged again, as described above.

The resulting structure of the incrementer array 50 is highly structured, and can be therefore be fabricated much smaller in size compared to conventional adders. Additional space is required for the sense amplifiers 72 and the complement bit-lines 62*b*; however, the incrementer array 50 still results in high area effectiveness and overall increased performance.

Another advantage of the present invention is the possibility of reducing design time. The array approach of this invention is highly transferable to other function units where some circuits blocks can be shared without significant modification. For example, the array approach may be used to implement arithmetic functions such as Count-Leading Zeros and Compare functions, as well as dynamic programmable logic arrays, as shown in FIG. 4.

Figure 4:
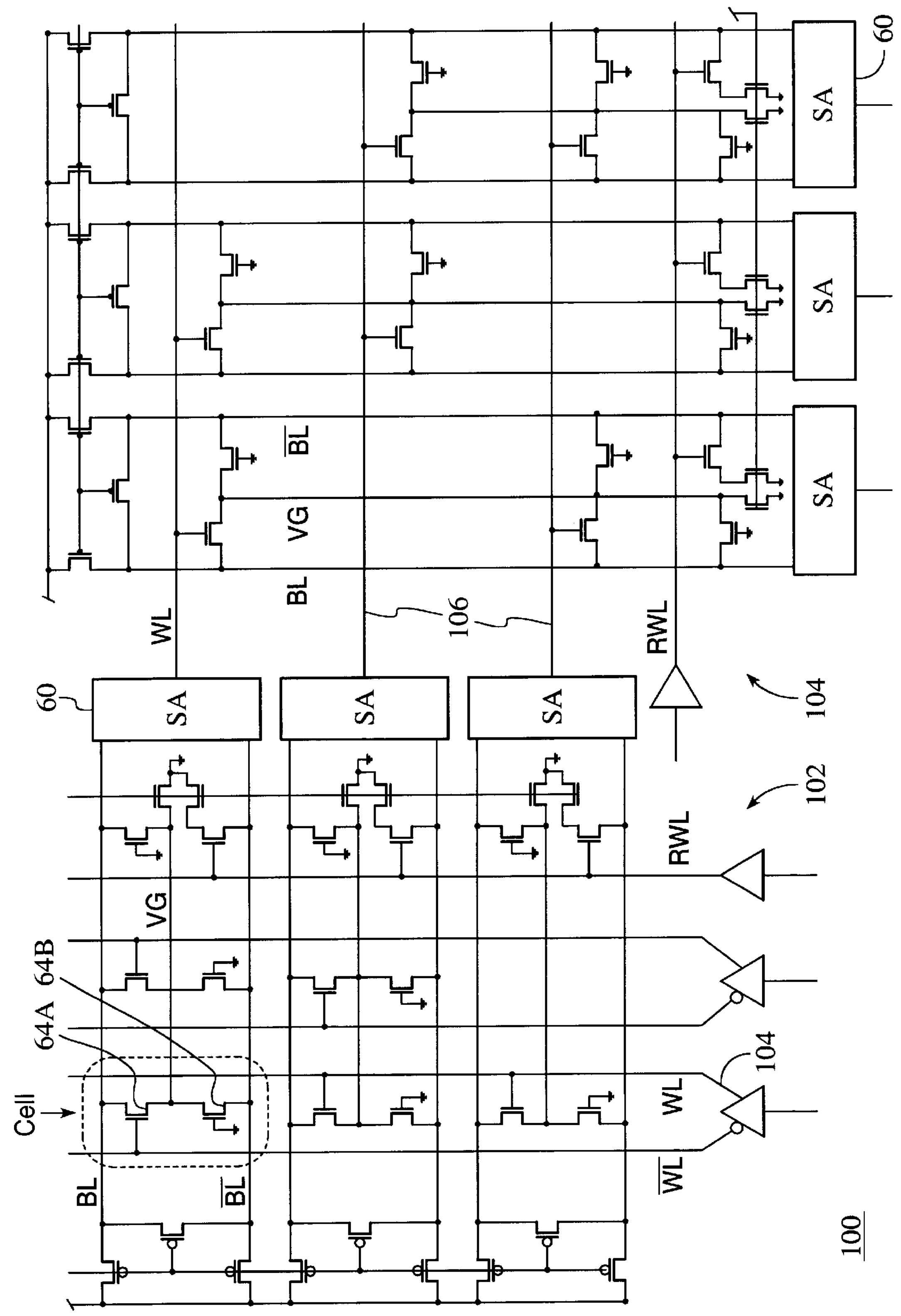
FIG. 4 is a block diagram illustrating the incrementer array of FIG. 2 extended to a dynamic programmable logic array (PLA)

FIG. 4 is a block diagram illustrating the incrementer array of FIG. 2 extended to a dynamic programmable logic array (PLA), where like components have like reference numerals. The PLA 100 includes an AND plane 102 and an OR plane 104. The AND plane 102 is similar to the incrementer array 50, except that the true input signals 60 are also input into the array via the word lines. The function of the AND plane 102 is to NOR the complement input signals. The output of AND plane 102 is used as word line inputs 106 to the OR plane 104, whose function is to NOR the true input signals 60.

A high speed incrementer circuit having an array structure has been disclosed. Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A incrementer array for incrementing a data input value, the data input value comprising a plurality of bits, the incrementer array comprising:

a plurality of complement input signals representative of complement bit values of the input data;

a plurality of true input signals representative of true bit values of the input data;

a plurality of word lines forming rows of the array for transmitting the complement input signals;

a plurality of bit-line pairs coupled to particular ones of the word lines in the rows of the array, each one of the plurality of bit-line pairs located in a respective column of the array;

a plurality of sense amplifiers, each one of the plurality of sense amplifiers coupled to a respective bit-line pair for sensing a voltage difference between the bit-line pair, such that the bit-line pair and the sense amplifier perform a logical NOR of the complement input signals to produce a NOR output; and a plurality of exclusive-or gates, each one of the plurality of exclusive-or gates coupled to a respective NOR output and to a particular one of the true input signals for generating an incremented output signal.

2. A incrementer array as in claim 1 further including a plurality of cells arranged in an upper diagonal pattern, each one of the plurality of cells coupled to a respective word line and bit-line pair.

3. A incrementer array as in claim 2 wherein the incrementer array includes N columns, each of the columns including a different number of cells, wherein the number of cells in column(i)=(N−1)−$N_i$, where i=0 to N.

4. A incrementer array as in claim 3 further including a reference word line coupled to the bit-line pairs for generating a voltage difference between the respective bit-lines in each pair of bit-lines.

5. A incrementer array as in claim 4 wherein each bit-line pairs include a bit-line true and a bit-line complement.

6. A incrementer array as in claim 5 wherein each cell includes a primary transistor and a dummy transistor coupled between the bit-line true and the bit-line complement of each bit-line pair.

7. A incrementer array as in claim 6 wherein the primary transistor in each cell is coupled between the word line in the row location of the cell, and the bit-line true located in the column of the cell.

8. A incrementer array as in claim 7 further including a virtual ground signal in each column coupled between ground and the dummy transistors located in the column.

9. A method for providing a high-speed incrementer array that increments a data input value comprising a plurality of bits, the method comprising the steps of:

a) representing the bits of the input data as a plurality of true input signals and a plurality of complement input signals;

b) inputing the plurality of true input signals into a plurality of exclusive-OR gates that delineate columns of the array;

c) inputing the plurality of complement input signals on a plurality of word lines that delineate rows of the incrementer array;

d) providing a primary transistor at predetermined row and column intersections in the incrementer array;

e) providing a pair of bit-lines for each column in the incrementer array, each pair of bit-lines coupled to each of the primary transistors in the corresponding column;

f) providing a sense amplifier for each column in the array, each sense amplifier coupled to the pair of bit-lines in the corresponding column for providing NOR output signal of the input complement input signals; and g) inputing the NOR output signal from of the sense amplifiers into the exclusive-Or gate in the corresponding column to exclusively-Or the Nor output signals with the true input signals to provide incremented output signals.

10. The method of claim 9 wherein step d) further includes the step of:

d1) coupling the primary transistor at each row and column intersection to the word line in the corresponding row.

11. The method of claim 10 wherein step d) further includes the steps of:

d2) coupling a dummy transistor between each one of the primary transistors and a corresponding pair of bit-lines; and d3) coupling a virtual ground signal between ground and each of the dummy transistors in each of the respective columns in the incrementer array.

12. The method of claim 11 wherein the incrementer array includes an upper diagonal and a lower diagonal, step d) further including the step of:

d4) providing the primary transistors and the dummy transistors at row and column intersections that form one of the of the upper diagonal and the lower diagonal.

13. The method of claim 12 wherein step e) further includes the step of:

e1) coupling a reference word line to each of the pairs of bit-lines for generating a voltage difference between the respective bit-lines in each pair of bit-lines.

14. A incrementer array for incrementing a data input value comprising a plurality of bits, the incrementer array comprising:

a plurality of complement input signals representative of complement bit values of the input data;

a plurality of true input signals representative of true bit values of the input data;

a plurality of word lines forming rows of the array for transmitting the complement input signals;

a plurality of bit-line pairs coupled to particular ones of the word lines in the rows of the array, each one of the plurality of bit-line pairs located in a respective column of the array;

a plurality of cells, each cell coupled to a respective word line and bit-line pair;

a plurality of virtual ground signals, each one of the plurality of virtual ground signals coupled between ground and the cells located in a respective column;

a plurality of sense amplifiers, each one of the plurality of sense amplifiers coupled to a respective bit-line pair for sensing a voltage difference between the bit-line pair, such that the bit-line pair, the cells, and the sense amplifier perform a logical NOR of the complement input signals to produce a NOR output; and a plurality of exclusive-or gates, each one of the plurality of exclusive-or gates coupled to a respective NOR output and to a particular one of the true input signals for generating an incremented output signal.

15. A incrementer array as in claim 14 wherein the incrementer array includes N columns, each of the columns including a different number of cells, wherein the number of cells in column(i)=(N−1)−$N_i$, where i=0 to N.

16. A incrementer array as in claim 15 wherein a first incrementer array and a second incrementer array form a first and second plane of a programmable logic array.

* * * * *